Dec. 11, 1956 A. S. WHEELBARGER ET AL 2,773,640

FARE BOX

Filed April 18, 1952 6 Sheets-Sheet 1

INVENTORS

ALBERT S. WHEELBARGER

EDWARD C. WARRICK

BY Strauch, Nolan & Diggins

ATTORNEYS

Dec. 11, 1956 A. S. WHEELBARGER ET AL 2,773,640

FARE BOX

Filed April 18, 1952 6 Sheets-Sheet 2

INVENTORS
ALBERT S. WHEELBARGER
EDWARD C. WARRICK
BY
Strauch, Nolan + Diggins
ATTORNEYS Dec. 11, 1956 A. S. WHEELBARGER ET AL 2,773,640

FARE BOX

Filed April 18, 1952. 6 Sheets-Sheet 3

INVENTORS
ALBERT S. WHEELBARGER
EDWARD C. WARRICK
BY Strauch, Nolan & Diggins
ATTORNEYS Dec. 11, 1956 A. S. WHEELBARGER ET AL 2,773,640

FARE BOX

Filed April 18, 1952 6 Sheets-Sheet 4

INVENTORS
ALBERT S. WHEELBARGER
EDWARD C. WARRICK
BY Strauch, Nolan & Diggins
ATTORNEYS Dec. 11, 1956 A. S. WHEELBARGER ET AL 2,773,640

FARE BOX

Filed April 18, 1952 6 Sheets-Sheet 5

INVENTORS

ALBERT S. WHEELBARGER

EDWARD C. WARRICK

BY Strauch, Nolan & Diggins

ATTORNEYS

FARE BOX

Filed April 18, 1952 6 Sheets-Sheet 6

INVENTORS
ALBERT S. WHEELBARGER
EDWARD C. WARRICK
BY Strauch, Nolan & Diggins
ATTORNEYS 2,773,640

FARE BOX

Albert S. Wheelbarger, Dayton, and Edward C. Warrick, West Liberty, Ohio, assignors to Rockwell Register Corporation, Bellefontaine, Ohio, a corporation of New York Application April 18, 1952, Serial No. 283,084

18 Claims. (Cl. 232—16)

This invention relates to improvements in fare boxes, and in particular to lock boxes therein, in which the deposited fares are collected and from which collected fares may be removed only by authorized personnel.

Fare boxes for the reception of fares collected on trolleys, buses or the like, or in any environment where admission charges are made, may take several forms. One of the main reasons for using a fare box is to assure that paid fares or admissions are actually turned over to the proprietor and not misapplied to the personal benefit of the collector. In order to assure that deposited fares are actually turned over to the proprietor, they may be collected in a vault or lock box from which they cannot be removed except by authorized personnel. Alternately, they may be collected in a registering fare box that actually counts the deposited fares, so that the conductor must account for the registered fares. Those boxes that register the fares may be so constructed as to allow the conductor to remove them for the purposes of making change, or they may deliver them to a vault or lock box from which he cannot remove them.

The present invention relates particularly to those types of fare boxes where the deposited fares, whether they be counted and registered or not, are automatically deposited into a safe, or lock box, from which they can be removed only by authorized personnel. United States Patent No. 901,778 to Bucknam is an example of the prior art fare boxes of this general type.

It is desirable that the lock boxes or safes be so constructed that they will be open for the reception of deposited fares once they are inserted into the fare boxes, and that they be fully locked to prevent the removal of fares by other than authorized personnel when they have been removed from the fare boxes. While lock boxes intended to be used in this manner have been known previously to this invention, they have not been entirely satisfactory in that they have not been fool-proof, they require an unwarranted number of locking devices, and they are of expensive construction.

In accordance with the present invention there is provided a novel and improved lock box having the characteristics of simplicity of operation, reasonable cost, and of being fool-proof to prevent theft or misappropriation of collected fares. Only two locks are necessary, being operated by different keys. One key is required to remove the lock box from the safe, and mechanism is provided to assure that the lock box is completely closed and locked before such removal. A second key is required to open the box to remove its contents. No key is required to lock the box within its safe upon insertion, this locking operation being automatic in response to the insertion of the box into the safe. Further, the mechanism is operative to assure that the box be fully inserted and locked within the safe before the fare box is rendered operative.

It is therefore a major object of the invention to provide a novel lock box and fare box combination that prevents loss of collected fares but which requires only a minimum number of manually operated locking devices to assure operation.

More specifically the fundamental object of this invention is to prevent loss of collected fares by providing in a fare box an improved lock box construction by which an open lock box can be inserted and automatically locked in position in a fare box without the use of a key, by which the lock box can be removed from the fare box only by the custodian of a first key and only after the box is completely closed and locked, and by which access to the contents of the lock box can only be had by the custodian of a second key.

In accordance with the major object of this invention it is another important object of the invention to provide a novel combination of fare box and lock box that assures that the fare box is inoperative to feed fares to the lock box until the lock box is fully inserted and locked therein.

It is another important object to provide a novel and improved fare and lock box combination by which the lock box can be inserted and locked within the fare box without the use of a manually operated lock.

Another important object is the provision of automatic locking means that prevents only partial insertion of the lock box into the fare box in such a manner that it could be surreptitiously removed after such partial insertion.

It is still another object of the invention to provide a novel lock box construction wherein, the lock box is in open condition for the reception of deposited fares so long as it is locked within the fare box but which is of such construction that it must be completely closed and locked before it can be removed from the fare box.

More specifically it is an object of the present invention to provide in a fare box a novel lock box and safe construction by which a lock box having an open fare receiving opening can be inserted and automatically locked within the fare box safe and by which the lock box can be removed from the fare box safe only after manipulation of a lock controlled mechanism which is successively operative to close the fare receiving opening, lock such closure, and release the lock box from the safe.

These and other objects will become more fully apparent by references to the appended claims and as the detailed description proceeds in connection with the accompanying drawings, wherein:

Figures 1, 2:
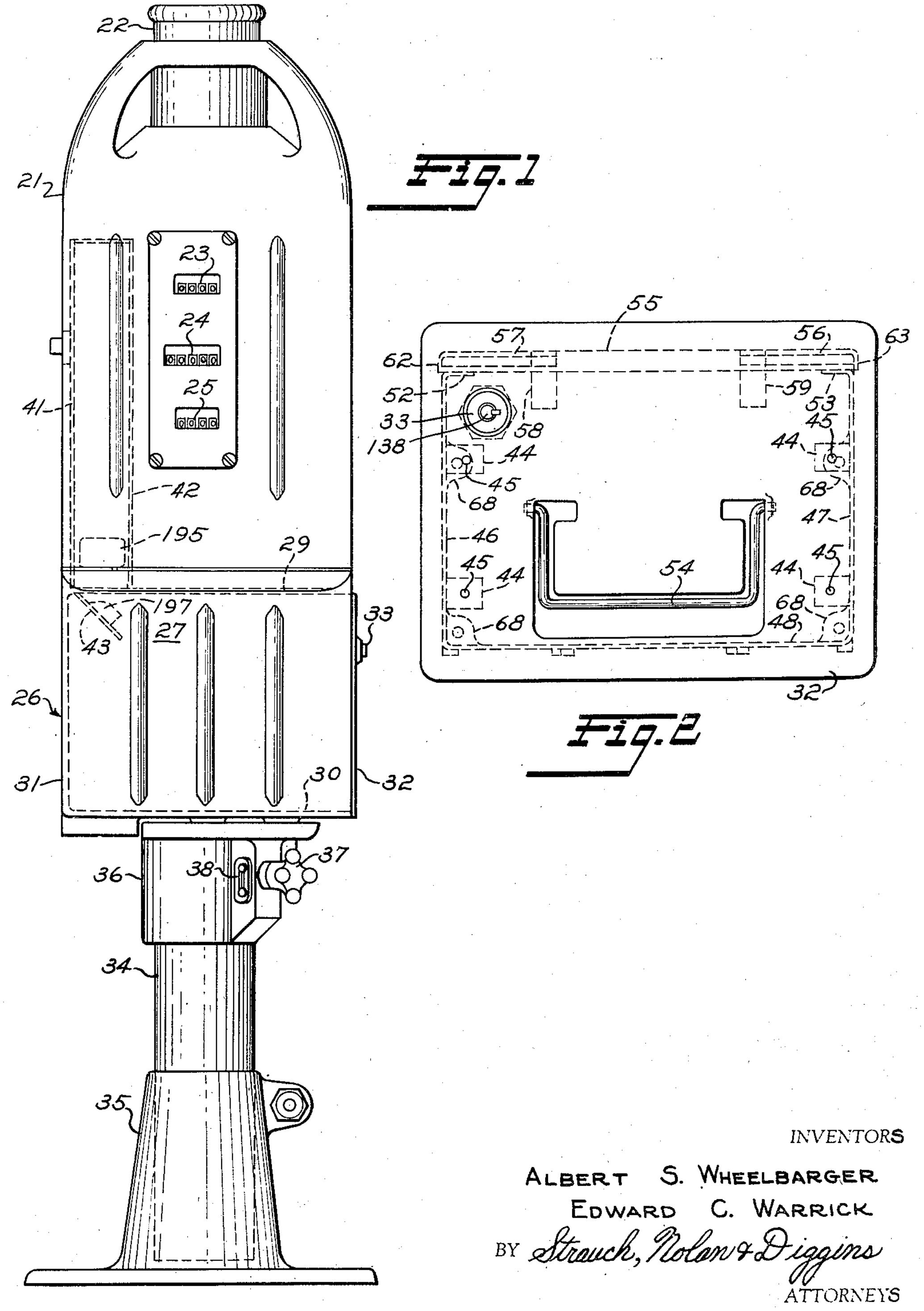
Figure 1 is a side elevation view of a complete fare box and supporting stand in which the invention is embodied.
Figure 2 is a side view of the lock box alone, as viewed from the right of Figure 1.

Referring to Figure 1, a fare box is indicated at 21. The illustrated fare box is of the type shown in copending application Serial No. 185,532 filed September 19, 1950 for Fare Boxes by Edwin W. Haas et al. While the fare box shown generally in Figure 1 is of the registering type, wherein every coin or token deposited in a receptacle 22 is automatically counted and registered by counters indicated at 23, 24 and 25, it is to be understood that the instant invention is illustrated in such an arrangement only by way of example, because since the locking box is designed to positively retain and lock all deposited coins, tokens or tickets etc., it is not necessary that the registering mechanism of the afore-mentioned application be used.

Figure 11:
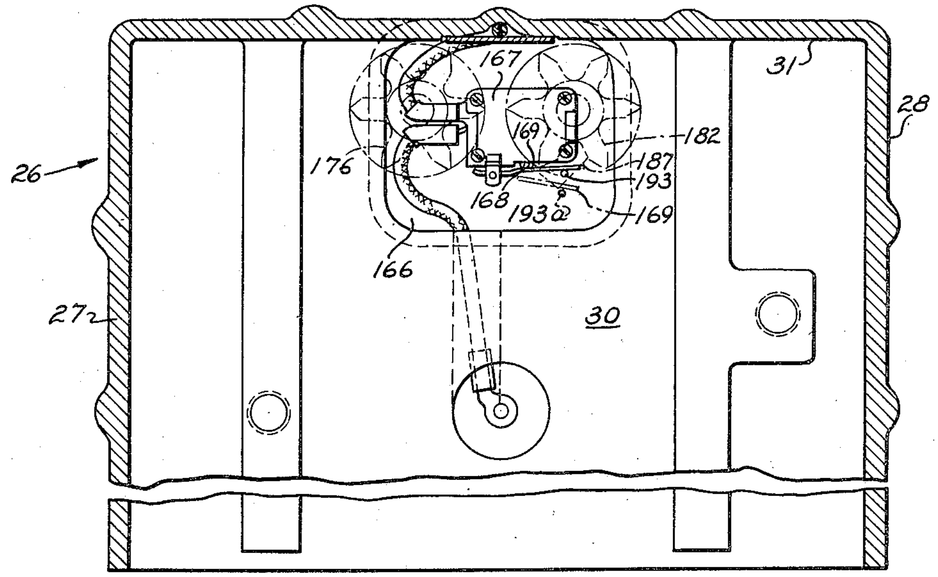
Figure 11 is a fragmentary sectional view of the lock box housing taken substantially along the line 11—11 of Figure 12, and showing the control switch that is controlled by the insertion of the coin box into the housing.

The fare box 21 is secured by screws or the like, not shown, to the top of a casting forming a safe 26 (Figure 1) having side walls 27 and 28 (Figure 12) top and bottom walls 29 and 30 and back wall 31 (Figure 11). The safe is constructed so as to receive a removable sliding drawer or receptacle, to be described, and having a front wall 32 that also forms the front wall of the safe when the drawer is in place. A key-operated lock 33 on the front wall 32 of the drawer controls certain locking and releasing operations relative to the drawer that will be described. A pedestal 34 having a foot-flange 35 that is secured to the vehicle floor (bus or trolley car or the like) supports at its upper end another fitting 36 that is affixed to the bottom wall 30 of the safe 26 and which is clamped to the top of the pedestal by a hand-screw 37. A sealing device indicated generally at 38, the construction of which forms no part of this invention, prevents surreptitious removal of the fare box 21 and its attached safe 26 without breaking of the seal. Indicated in dotted lines at 41 and 42 in Figure 1 are opposed walls of a downwardly extending chute that delivers fares in the form of coins, tokens, tickets, etc., to the removable drawer within the safe 26, which fares may have passed through a signalling device as described in the aforementioned copending application of Haas et al. A closable trap door 43 which is part of the drawer in the safe is indicated in its lowered position by dot-dash lines in Figure 1, said trap door when in the lowered position indicated in Figure 1 being operable to deliver fares into the sliding drawer in the safe 26, the trap door being raised to a horizontal closed position by operation of the lock 33 before the drawer is removed from the safe, as will be explained.

Figures 3, 4:
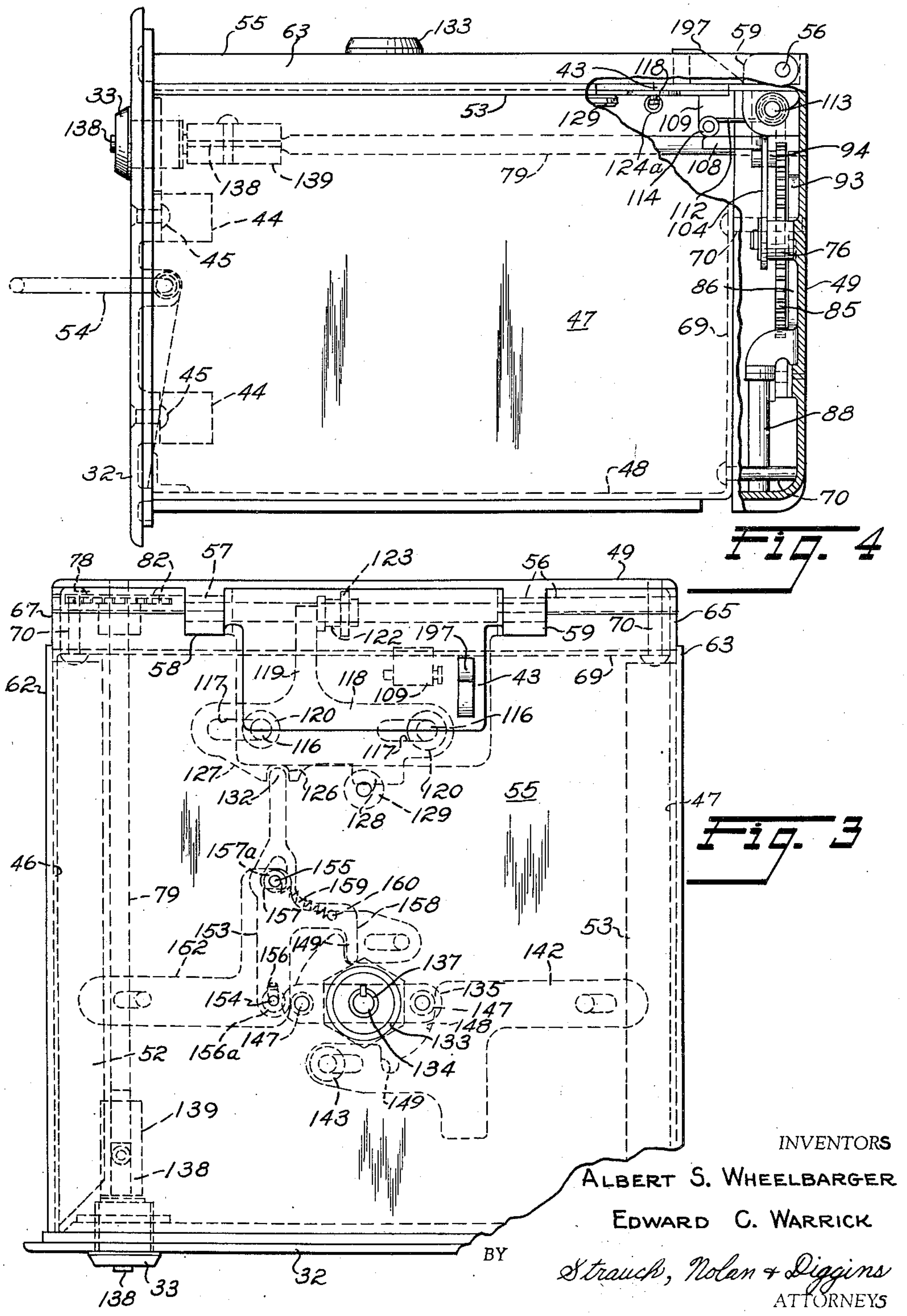
Figure 3 is a top plan view of the lock box shown in Figure 2, being illustrated in its closed position.
Figure 4 is a side elevation view partially in section of the lock box, as viewed from the right hand side of Figure 2.

The removable sliding drawer that, when inserted into the safe 26 of Figure 1, forms the receptacle for fares, is shown in Figures 2–4. It comprises a receptacle having the front wall 32 secured as by brackets 44 and rivets 45 to side walls 46 and 47, and an integral bottom wall 48. At their upper ends the side walls 46 and 47 have inwardly turned flanges 52 and 53. The front wall 32 is provided with a recessed hinged handle 54 that may be raised to the position shown in Figure 4 when removing or inserting the drawer into the safe 26. The drawer is provided with a hinged lid 55, preferably in the form of a die-casting. The lid 55 is hinged to the back wall 49 of the drawer by means of a pair of pins 56 and 57 that pass through the rear end of the lid and through a pair of lugs 58 and 59 that may be integrally cast with the back wall 49 of the drawer. The lid may have depending flanges 62 and 63 (Figures 2–7) on its side edges, that overlap the drawer side walls 46 and 47 when the lid is closed.

Figures 5, 6, 7:
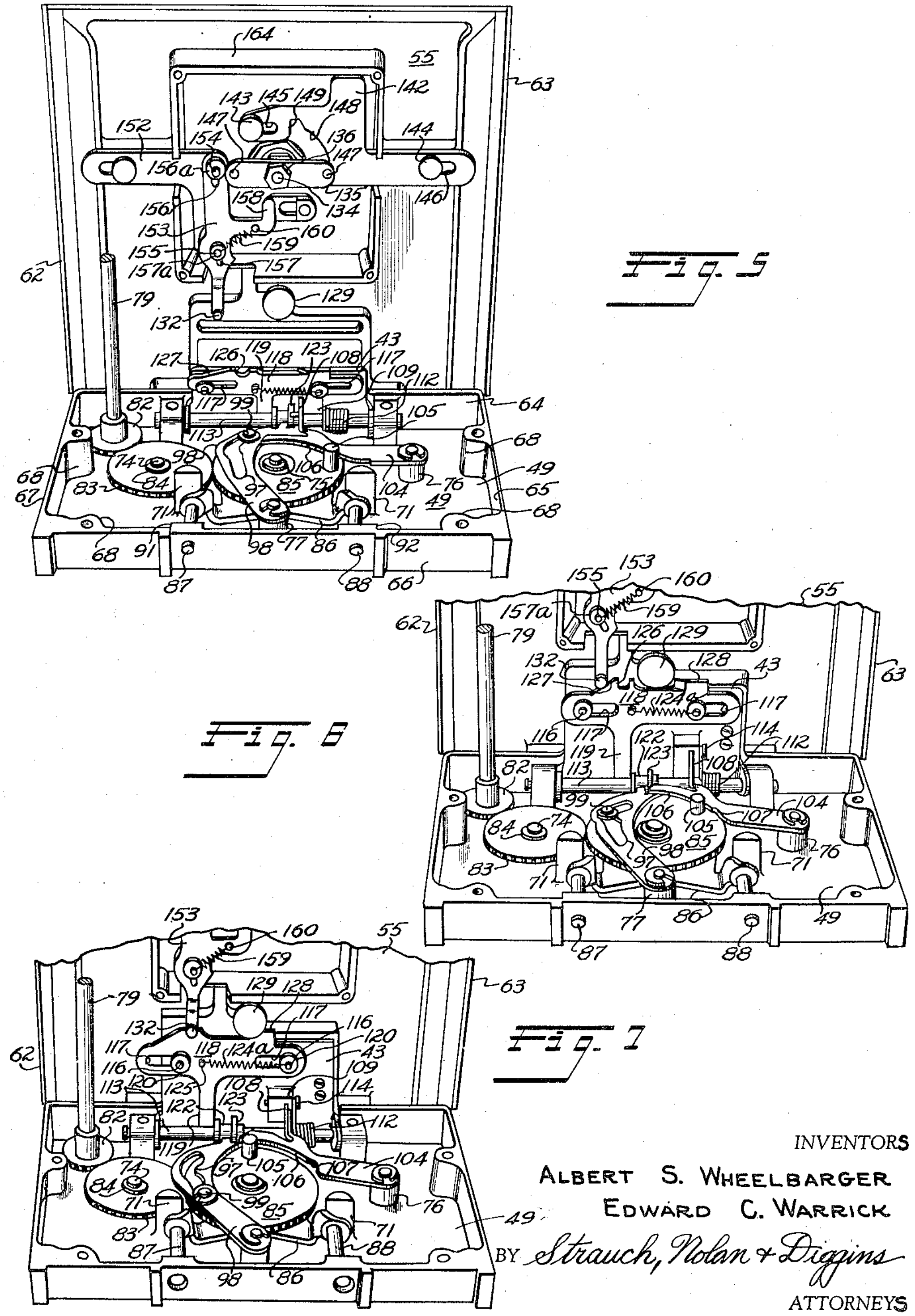
Figures 5, 6 and 7 are perspective views of the inside of the back wall and hinged lid of the lock box showing the trap door for the fare receiving opening and the associated operating mechanism therefor in three sequential positions, the cover plate for the back wall having been removed.

As best shown in Figures 5–7 the back wall 49 of the drawer is in the form of a casting that includes four peripheral walls 64, 65, 66 and 67 (Figure 5) and also four integral hollow bosses 68. These four peripheral walls 64–67 are coplanar with and in fact extensions of the side walls 46 and 47, the bottom wall 48, and the top flanges 52 and 53 of the sliding drawer. A cover plate 69 (Figures 3 and 4), removed in Figures 5–7, covers the space bounded by the peripheral walls 64—67, to enclose the mechanism shown in Figures 5–7 that controls the closing and locking of the trap door 43, and the mechanism that locks the drawer in the safe, as will be explained. This cover plate is secured to the back wall 49 as by four rivets 70 (Figures 3 and 4) that pass through the holes in the four hollow bosses 68. Other rivets, not shown, may secure the central portions of the plate cover plate 69 to the back wall 49, buckling of the plate 69 toward the back wall being prevented by a pair of bosses 71 (shown only in Figures 5–7 and 10) integral with back wall 49, and equal in length to the hollow bosses 68.

The mechanism enclosed in the drawer between the back wall 49 and the cover plate 69, best shown in the perspective views of Figures 5–7 and in Figure 10, will now be described.

Suitably mounted upon the drawer back wall casting 49 are four studs 74, 75, 76 and 77. Studs 74—76 are substantially in the same horizontal line, and stud 77 is substantially vertically below stud 75. At 78 (Figure 10) is a hollow boss forming a journal for the rear end of a rotatable horizontal shaft 79 that has fixed thereto a driving pinion gear 82. Coplanar with and driven by gear 82, and mounted for rotation upon stud 74 is an intermediate gear 83, retained upon its stud by a split washer 84 or the like. Mounted for rotation upon stud 75 coplanar with and driven by intermediate gear 83 is a gear or locking disc 85. This gear or locking disc 85 is spaced from the back wall 49 in a position coplanar with intermediate gear 83 by a locking pin cam plate 86. This locking pin cam plate 86 moves only in a vertical direction as viewed in Figure 10, being guided in its vertical movements by means including a pair of integral drawer locking pins 87 and 88 that pass through guiding holes in bosses 91 and 92 in the back wall extension 66. The movement of cam plate 86 and its integral locking pins 87 and 88 is not very great. When in its uppermost position the locking plate withdraws the pins 87 and 88 into the bosses 91 and 92 as shown in Figures 7 and 10. When the cam plate 86 is in its lowermost position however, the locking pins protrude below the back wall extension 66 as shown in Figures 5 and 6 and in the dot-dash position shown at 87*a* and 88*a* in Figure 10. In order to provide a third guide for the cam plate 86 it includes an upwardly curving arm 93 shown only in dotted lines in Figure 10, that includes at its upper end a vertical slot 93*a* through which passes a pin 94, that is secured to the back wall 49 as by riveting or the like. The cam plate 86 also includes a cam profile 95 that extends to the right as viewed in Figure 10, this profile being circular, with its axis the center of stud 75 when the cam plate 86 is in its lowermost position. This circular profile is engaged by a pin 96 (Figure 10) on the back of the gear 85, which pin pushes the cam plate downwardly and holds it there during most of the reciprocative movements of gear 85. The movements of gear 85 are limited, by the ends of a sinuous slot 97 in a locking lever 98, within which slot travels a pin 99 carried by one face of the gear 85.

Figures 10, 13:
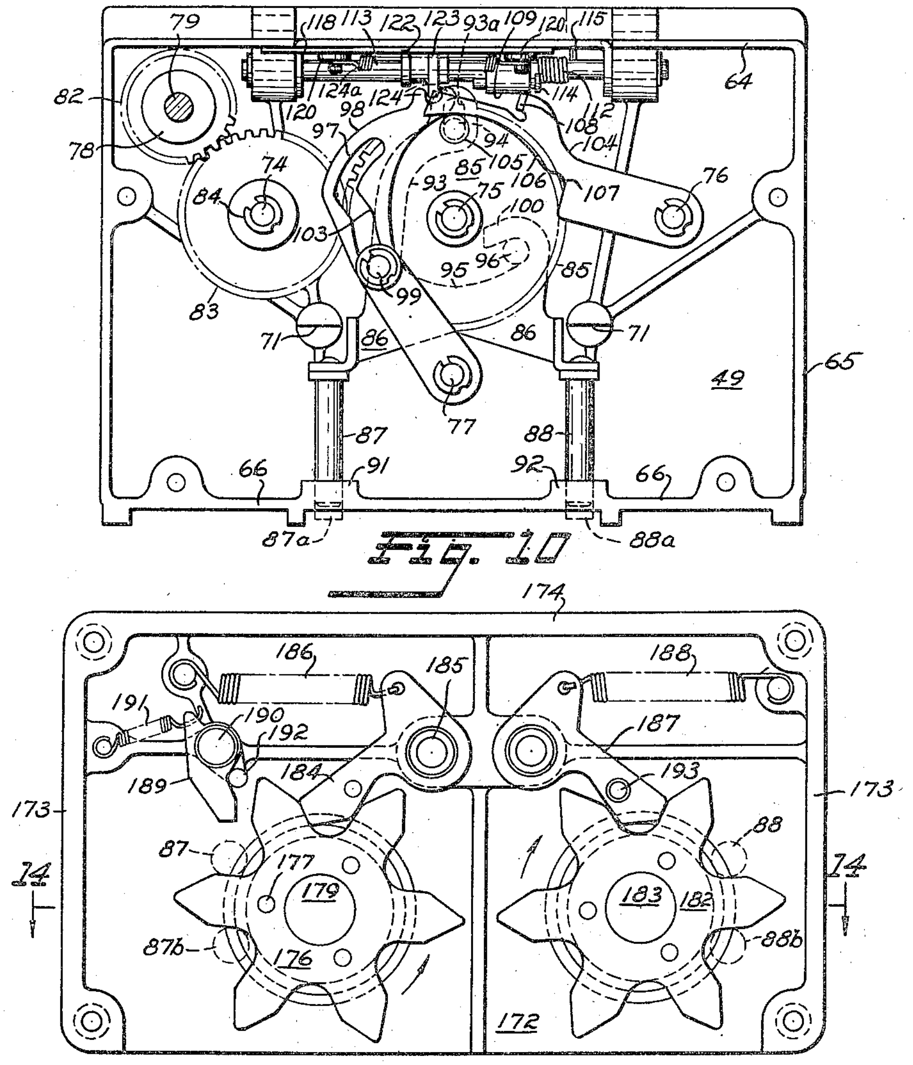
Figure 10 is a view in front elevation, of the lock box back wall with a covering plate removed, showing the key-operated mechanism for controlling the lock box locking pins and the hinged trap door for the fare receiving opening of the lock box.
Figure 13 is a bottom plan view of the latching mechanism that retains the coin box in its housing, once inserted, being substantially a sectional view along the line 13—13 of Figure 12.

As the gear 85 approaches the end of its counterclockwise movement, as viewed in Figure 10, the pin 96 on the back of the gear engages a hook 100 on the right hand end of the cam plate profile 95, and raises the cam plate 86 to the upper end of its stroke. This raises the drawer locking pins to their withdrawn or upper position as shown in Figure 7 and in their dotted line position shown in Figure 10. It is thus apparent that the locking pins 87 and 88 are always in their protruding or lowermost position except when the gear is substantially at the end of its counter-clockwise stroke as viewed in Figure 10.

The sinuous profile of the slot 97 that engages pin 99 on gear 85, includes a lower portion (Figure 10) that is circular, with stud 75 as a center when gear 85 is in the end portion of its counter-clockwise movement. Thus during this portion of the strokes, clockwise or counter-clockwise, of the gear 85, there will be no movement of lever 98. The upper portion of the slot 97 also includes a circular portion having as a center the stud 75 when the gear 85 is near the end of its clockwise movement. It is near the midpoint of the length of the slot 97 that its profile includes a changing portion 103 (Figure 10) that will rotate locking lever 98 counter-clockwise as the gear 85 moves counter-clockwise, and vice versa. Such movement of locking lever 98 in the counter-clockwise direction is effective to latch the trap door 43 in its closed position after door 43 has been raised to such position, as will be explained, this latching being accomplished just prior to the lifting of pins 87 and 88 to permit removal of the sliding drawer or lock box from the safe.

A trap door closing lever 104 is pivoted upon the stud 76. This lever is actuated by a pin 105 carried by the gear 85, and is best shown in Figures 5–7. In Figure 10, pin 105 is coaxial with guide pin 94 for the locking pin cam plate 86, but this occurs only when gear 85 is at the end of its counter-clockwise stroke, as in Figure 7. Pin 105, during most of the stroke of gear 85, engages a circular profile 106 on the lever 104, during which time the lever 104 is held in the raised position shown in Figures 10, 6 and 7. However, as the gear is rotated clockwise, at a point preceding the end of its stroke, the pin 105 passes into a recess 107 in lever 104, which recess permits the lever 104 to drop to the position shown in Figure 5. Thus, the door closing lever 104 has a first or lowered position when the gear 85 is substantially at the end of its clockwise stroke. During the other positions of the gear 85 the pin 105 maintains the lever 104 in its uppermost position, shown in Figure 10, and in Figures 6 and 7.

The function of the door closing lever 104 is to raise the trap door 43 from its lowered position shown in Figures 1 and 5 to its closed or horizontal position shown in Figures 4, 6, 7 and 10. This is accomplished by an integral lip 108 extending at right angles from lever 104, and which engages a downwardly extending abutment 109 on the underside of the trap door. The trap door itself is resiliently urged downwardly toward the bottom of the drawer by a coiled spring 112 carried by a shaft 113, directly below the pins 56 and 57 upon which the drawer lid 55 is hinged. One end of the coil spring is secured to the abutment 109 by a pin 114, and the other end 115 (shown only in Figure 10) abuts against the drawer back wall 49. The effect of the coil spring 112 is to keep the abutment 109 in engagement with the lip 108 on the door closing lever, irrespective of the position of the latter, and whether the drawer is in horizontal or vertical position, except when the trap door is latched to the hinged drawer lid, as will be explained.

Slidably attached to the underside of the trap door 43 is a latching plate or bolt 118 (Figure 7) that is slidably connected to the trap door by a pair of pins 116 passing through rectilinear slots 117 in the plate 118. A pair of washers 120 below the latching plate retain it against the underside of the trap door. A finger 119 on the plate 118 extends backwardly to a point where it overlies the shaft 113 upon which the trap door is pivoted, and lies in the path of a collar 122 slidable upon shaft 113. The collar 122 has a peripheral shoulder 123 that is engaged between a pair of spaced jaws 124 (best seen in Figure 10) on the upper end of locking lever 98, which jaws urge the collar 122 to the right or left upon shaft 113, with clockwise or counter-clockwise movements of the lever 98 as gear 85 is turned one way or the other. The collar 122 will move the finger and latching plate 118 to the left as viewed in Figure 7, but movement of the latching plate 118 to the right, to the end of its stroke as viewed in Figure 5 is solely by the effect of a tension spring **124*a* connected to one of the stationary pins 116 and to a pin 125 on the plate 118**.

Protruding from the latching plate 118 on the opposite side from the finger 119 is a notch 126 (best seen in Figures 6 and 3) having an inclined approach cam 127 to its left. Spaced from notch 126 and to the right thereof is a lip 128. When latching plate 118 has been moved to the left to the position shown in Figure 7, the lip 128 slides into a slot in a stud 129 that is secured to the underside of the hinged drawer lid 55. In normal operation this will occur only when the trap door has been raised to closed position, and the function of the lip 128 is to engage the slot in stud 129 to hold the trap door closed. A latching pin 132, which is to be described, has the function of holding the latching plate 118 in the position shown in Figure 7 thus holding the trap door in closed position until the hinged drawer lid is unlocked.

Mounted in the hinged drawer lid 55 is a lock 133 (Figure 3) similar to the lock 33 on the drawer front wall 32. These locks are not novel, being obtained commercially, but are peculiarly useful in the combination shown. Lock 133 has a rotatable shaft 134 that extends entirely through the lock and has on the end thereof beneath the lid 55 a two arm lever 135, retained on the shaft 134 for rotation therewith by a nut 136. Locks 33 and 133 are operated by similar hollow cylindrical keys, not shown, but which must be fully inserted and pressed home axially of the locks before they can be turned. The shaft 134 of lock 133 cannot be rotated either by hand or by the key until its key has been pressed home axially. Once the key has been pressed home it can rotate the lock and the shaft 134. Also, once the key has been pressed home it can be removed only when returned to its initial position. In Figure 3 is shown the circular slot 137 formed by a circular hole and by the shaft 134. The hollow cylindrical key fits into this slot and has protuberances upon it that must be aligned with the shown slots (Figure 3) in both the lock and the shaft 134. The outer protuberance on the key retains the key in its lock, once pressed home and rotated. Lock 33 is similar, the end of its central shaft being shown at 138 in Figure 4. Although the locks 33 and 133 are similar, each requires a different key. Shown in this figure is a coupling 139 that secures the inner end of lock shaft 138 to the shaft 79 that rotates the driving pinion gear 82, previously described.

A lid latching plate 142 (Figure 5) is mounted on the underside of the lid 55 by a pair of headed studs 143 and 144 that have reduced portions passing through parallel slots 145 and 146 in the plate 142, thus limiting the plate 142 to a sliding rectilinear movement to the right or left as viewed in Figure 5. When the lid is down and the plate 142 is in its rightmost position as in Figure 5, the right end of the plate is engaged under the inwardly turned flange 53 (Figures 2 and 3) thus latching the lid in closed position. The latching plate 142 is moved to the right as in Figure 5 by a pin 147 that is carried by one end portion of lever 135 and extends upwardly. This pin engages a circular cam profile 148 on plate 142 that retains the plate 142 in its rightmost latching position until lock shaft 134 is turned counter-clockwise almost 90 degrees, whereupon pin 147 strikes abutment 149 on plate 142 and moves the plate to the limit of its movement to the left, as determined by the length of slots 145 and 146. The key cannot be removed from lock 133 until it has been rotated back to initial position, shown in Figure 5, where the box lid is again latched closed.

Another lid latching plate 152 is similar to and simultaneously actuated in the same manner to latch the other side of the lid 55 by passing under the other flange 52 on the other drawer side wall.

As is best shown in Figure 3, the previously mentioned latching pin 132 that engages in notch 126 in plate 118 is carried by a toggle lever 153. A pair of pins 154 and 155 secured to plate 152 pass through a pair of slots 156 and 157 in the toggle lever 153 and have washers 156*a* and 157*a* (Figure 5) on their ends to retain the toggle lever. The slot 157 is triangular shaped, as shown in Figure 3, so that toggle lever 153 may have a slightly pivotal as well as rectilinear motion. The toggle lever also has a leg 158 that is engageable by one of the pins 147 on lever 135 at the end of its lid unlatching stroke. A tensioned coil spring 159 secured to pin 155 and to a pin 160 on toggle lever 153, urges the toggle lever downwardly and clockwise, as viewed in Figure 5.

The function of the toggle lever 153 is as follows: With the drawer still in the safe 26 the proper key is inserted into lock 33 and turned counter-clockwise to raise the trap door 43 to closed position as well as to withdraw the drawer locking pins so that the drawer can be removed. The cam slot 97 is so shaped that the door closing lever 104 is raised to close the trap door and the trap door is latched closed before the locking pin cam plate 86 is raised. After the trap door is raised to closed position, continued rotation of gear 85 and locking lever 98 shifts collar 122 to the left to engage finger 119 on plate 118 and shift plate 118 to the left so lip 128 will be engaged under stud 129 to support and latch the trap door in closed position. As the latching plate 118 moves to the left the approach cam 127 on the plate engages the latching pin 132 and raises the toggle lever 153, as viewed in Figure 6 until the pin falls into the notch 126, the toggle lever 153 being resiliently urged downward to accomplish this by the action of spring 159. Now further rotation of the key in lock 33 raises the pins 87 and 88 so that the drawer can be removed from the safe. The key must then be rotated back to its initial position before it can be removed from the lock. However, rotation of the gear 85 back to its initial position shown in Figure 5 is ineffective to reopen the trap door, since the pin 132 resting in notch 126 prevents unlatching movement to the right of the latching plate 118 under the influence of coiled spring 124*a*. The turning of the key in lock 33 is effective however to return the drawer locking pins 87 and 88 back to their protruding position shown in Figure 5.

Figures 8, 9:
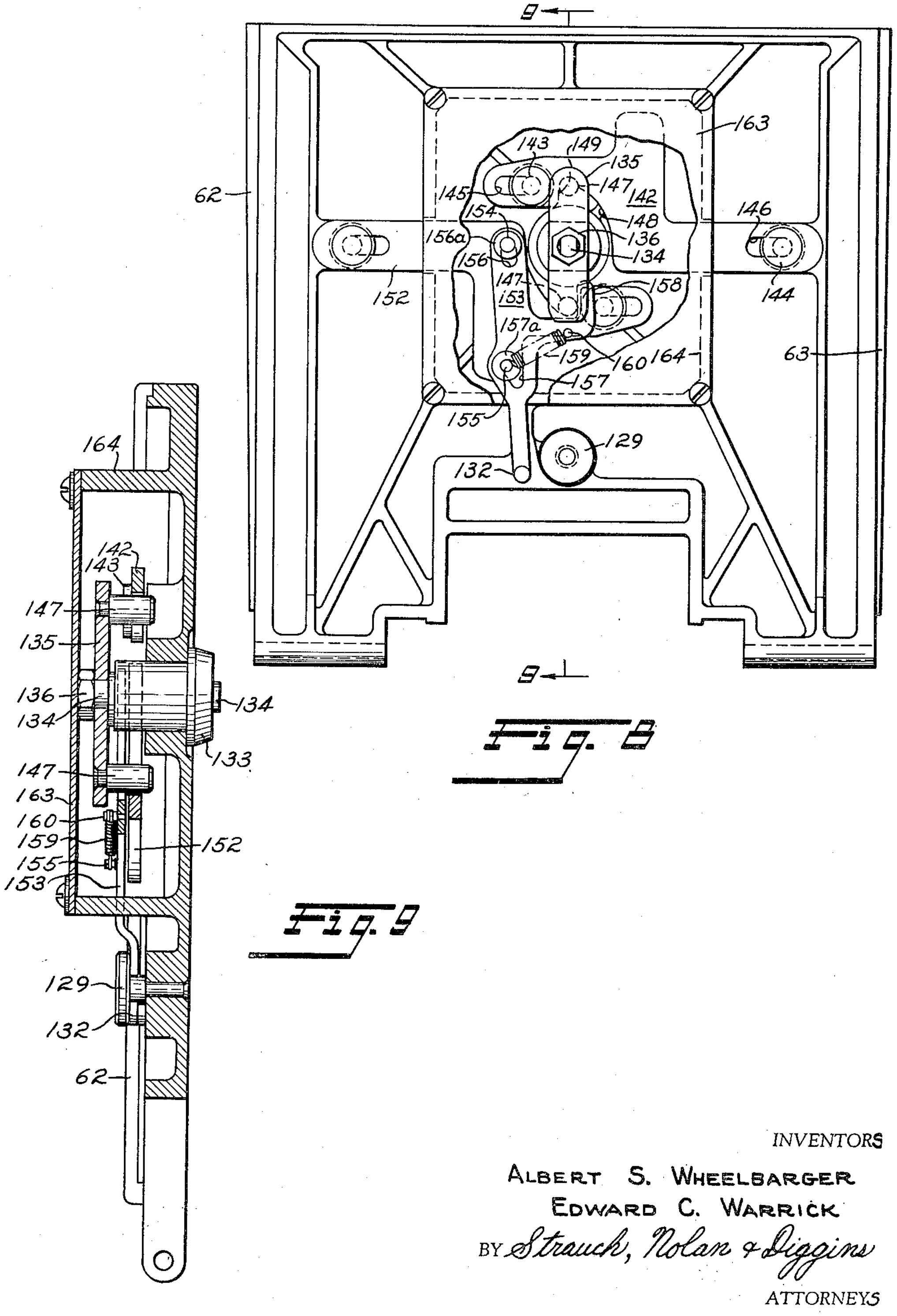
Figure 8 is a bottom plan view of the hinged lid of the lock box.
Figure 9 is a sectional view along the line 9—9 of Figure 8.

The trap door can only be opened by the key inserted in lock 133 for the purpose of opening the lid to remove collected coins, tokens, etc. As previously explained the key in lock 133 is ineffective to withdraw the lid latching plates 142 and 152 until nearly the end of the rotation of lever 135, because of the circular configuration of cam profile 148. However, the left hand pin 147 on lever 135 also engages the leg 158 on toggle lever 153 shortly before it engages the corresponding abutment 149. The arrangement is such, that as plates 142 and 152 are being withdrawn from latching position under drawer flanges 52 and 53, but before they clear these flanges, the pin 147 has shifted the toggle lever 153 far enough to the right so that the lip 128 on latching plate 118 clears stud 129 and allows the trap door 43 to open under the influence of spring 112. The afore-mentioned triangular slot 157 (Figure 3) in the toggle lever 153 permits a slight relative movement between lever 153 and the lid latching plate 152 that carries it, thus allowing the opening of the trap door before the lid 55 is released. A cover plate 163, shown only in Figures 8 and 9 is secured to the lower edge of a rectangular peripheral wall 164 to enclose most of the mechanism carried by the drawer lid.

Figure 12:
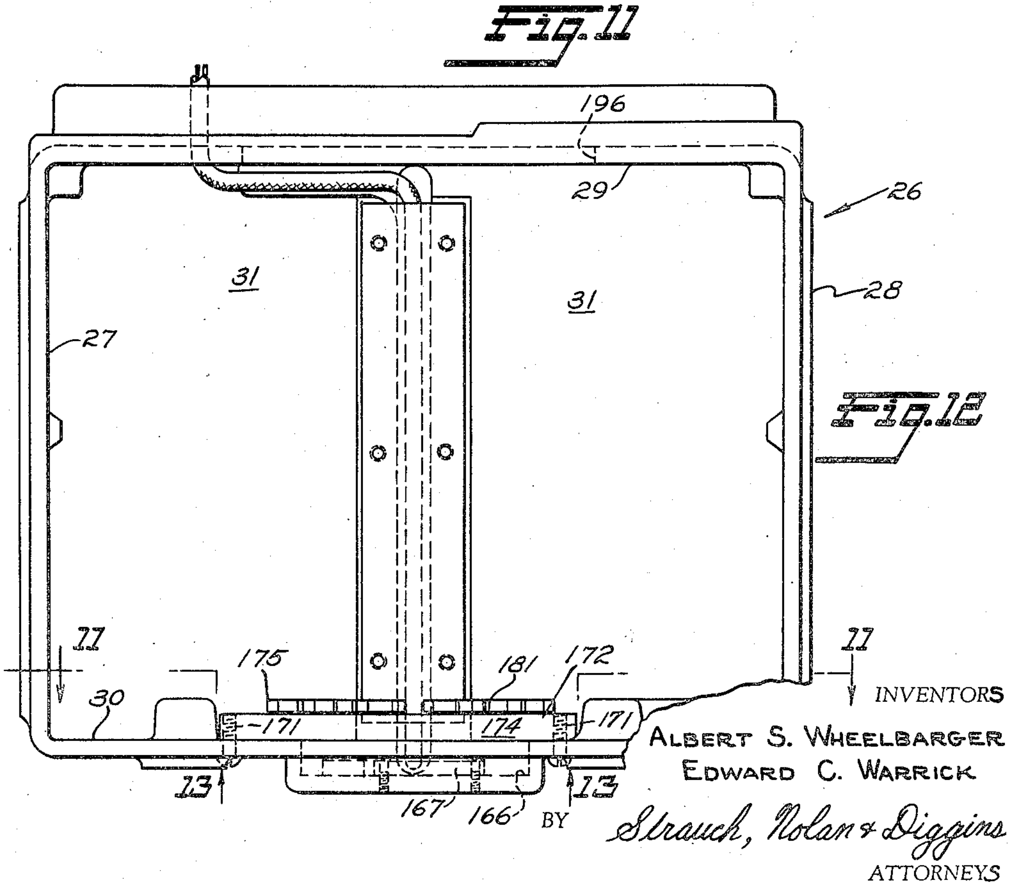
Figure 12 is a front elevation of the lock box housing shown in Figure 11, and with the coin box removed.

The locking mechanism that locks the drawer in the safe 26, by the action of the pins 87 and 88 protruding downwardly through the extension 66 of the drawer bottom wall will now be explained in reference first to Figures 11 and 12.

At the rear of the bottom wall 30 of the safe there is provided a well 166 in which is mounted a switch 167 having a plunger 168. The switch is closed when the plunger 168 is pushed inwardly against the action of an internal spring. A resilient lever 169 is pivotally mounted upon the switch casing in such position to depress or release the plunger 168. This switch is in the motor circuit for the fare box, if an electric drive motor is used, and must be closed before the motor circuit is energized.

Figure 14:
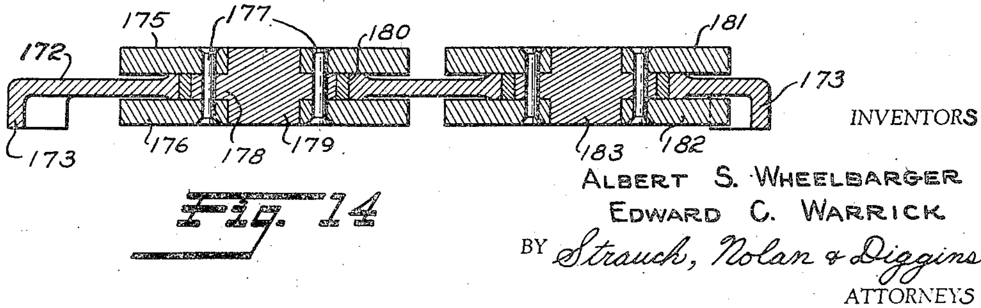
Figure 14 is a vertical sectional view, taken along the line 14—14 of Figure 13.

Secured over the well 166 as by screws 171 is a rectangular cup shaped housing best shown in Figures 13 and 14 and formed by a top wall 172 and depending side walls 173 and front wall 174. There are two star wheel assemblies mounted for rotation in the top wall 172. Referring to Figures 11–14, one pair of star wheels 175 and 176 are secured as by rivets 177 to opposite sides of a peripheral flange 178 on a hub 179 which is journalled for rotation in a bushing 180 in top wall 172. The star wheels 175 and 176 are riveted together through the flange 178 after being assembled upon the hub and flange with the hub 179 journalled by its flange 178 in the bushing 180. The other star wheel assembly comprising upper and lower star wheels 181 and 182 and hub 183, is mounted for rotation in wall 172 in the same manner.

A locking pawl 184 (Figure 13) pivoted upon a stud 185 and urged counter-clockwise by a tension spring 186 permits only counter-clockwise rotation of the left star wheel assembly after the pawl 184 has dropped into the illustrated position between two star wheel teeth. Star wheel 182 is similarly permitted to rotate only clockwise, by the action of the pivoted pawl 187 under the action of spring 188. However, both pawl 176 and 177 may be rotated in their permitted direction almost through the angle between adjoining teeth thus raising their pawls from their shown positions, and yet be reversed in direction of rotation in spite of pawls 184 and 187, because until the pawls again become seated as shown, they will permit reverse direction. The upper and lower star wheels of each assembly have their teeth juxtaposed, and the spacing of the axes of their hubs 179 and 183 is such that when the drawer locking pins 87 and 88 (Figure 5) are protruding from the bottom of the drawer and the drawer is inserted into the safe, pin 87 will engage a tooth on star wheel 175 and pin 88 a tooth on star wheel 181 to rotate such star wheels through the angle between adjoining teeth. In Figure 13 the drawer locking pins 87 and 88 are shown as dotted circles as they engage the teeth of the upper star wheels 175 and 181, but before they have rotated them as when the drawer has not yet been fully inserted into the safe. In the same figure the same pins are indicated by dotted circles at 87*b* and 88*b* which positions they will occupy after the drawer has been fully inserted, thereby rotating each of the star wheel assemblies through a rotation of one tooth, causing the teeth on the upper star wheels to lock the drawer in place, since the star wheels are prevented from rotating in the reverse direction because of the action of the spring pressed pawls 184 and 187 upon the lower star wheels. Thus it is only by the use of the proper key in lock 33 to raise the locking pins as previously described, that the drawer can be removed after being once fully inserted.

However, as mentioned before, unless the star wheels are rotated almost completely through the angle between adjoining teeth they can be re-rotated back in the other direction because the pawls 184 and 187 are substantially ineffective unless fully seated, as shown in Figure 13. Thus is might be possible to practically, but not quite fully, insert the drawer into the safe, yet it might be subsequently removed without the use of a key in lock 33. For this reason, a second or intermediate spring pressed pawl 189 is mounted upon a stud 190 and urged counterclockwise by a spring 191. As shown in Figure 13, this second pawl 189 is restrained from further counterclockwise movement beyond the position shown, by a pin 192. Once the outer end part of a tooth on the star wheel 176 has passed the intermediate pawl 189, the pawl snaps back to the position shown and prevents reverse rotation of the star wheel, even when the star wheel has been advanced only about one half of the angle between adjoining teeth. It will thus be apparent that if the drawer has not been pushed completely in, to the point where pawls 184 and 187 lock it in place, the pawl 189 will prevent its removal without the use of a key in lock 33. However, the intermediate pawl 189 will not prevent the full insertion of the box to the point where pawls 184 and 187 are fully effective. Without this additional feature the drawer might be inserted to the point at which the switch 167 will be closed and where the trap door underlies the coin chute formed by walls 41 and 42, so as to receive all the deposited fares, and yet be withdrawn without locking the trap door 43 so that its contents might be surreptitiously removed through the open trap door.

A switch-actuating pin 193 depends downwardly from the pawl 187, and its function is to press against the lever 169 on switch 167 (Figure 11) to hold the switch plunger 168 pushed in to close the switch 167 against the action of its internal spring. This is the action of the pin when the pawl 187 is fully seated between adjoining teeth on the star wheel 182, as in Figure 13. However, during any interval that the pawl is unseated, as when the drawer has not been fully pushed into the safe, movement of the pin 193 is to a point as indicated at 193*a* in Figure 11, allowing the internal spring in the switch 167 to push the lever 169 to the dot-dash position shown, and to open the switch. This lever 169 is stiff, but resilient enough to prevent breakage of the switch plunger due to excessive movement of pin 193.

A normally closed spring biased interlock switch 195 is mounted within the fare box casing above the opening 196 on the top wall 29 of the safe 26 through which the fares pass into the lock box or drawer. This switch 195 is similar to and is connected in series with switch 167 in the fare box operating circuit. Opening of switch 195 is controlled by a projection or lug 197 fixed on the top of door 43. When door 43 is raised to close and lock the lock box by manipulation of lock 33 in the manner previously described, lug 197 abuts against an operating member for switch 195 to open this switch 195 and disenable the fare box operating circuit. This interlock switch 195 thus prevents closing of the door 43 to permit collection of the fares on top of the door 43 and within the chute formed by walls 41 and 42 rather than within the lock box by disenabling the operating circuit of the fare box and thus preventing feeding of fares into the chute.

*Summary of Operation*

As a starting point for a complete cycle of operations the drawer is removed from the safe 26 and its lid 55 is in open position for the removal of the fares by the transit company auditor. The trap door 43 will also be open at this time. After removing the collected fares from the drawer the auditor will close the drawer lid 55. This can only be accomplished when the auditor's key is in lock 133 with the lid latching plates 142 and 152 withdrawn. Having lowered the drawer lid to closed position, the auditor must rotate the key in lock 133 before he can remove it. Such rotation locks the lid as the lid latching plates 142 and 152 move outwardly and engage under the flanges 53 and 52 respectively at the tops of the drawer side walls 46 and 47. The trap door 43 remains open and the locking pins 87 and 88 are in their lowermost position, protruding from the bottom of the drawer. The drawer is now in condition to be reinserted into a safe 26 of a fare box. No key is required for this operation of insertion. The locking pins 87 and 88 will rotate the star wheel assemblies as the drawer is pushed completely home. Star wheel locking pawls 184 and 187 will prevent removal of the drawer after it has been pushed completely home. Intermediate pawl 189 will prevent removal of the drawer if it has been inserted far enough to rotate the star wheel assemblies through a portion of the angular distance between the star wheel teeth, such as on half the angular distance. When the drawer is fully inserted, switch 167 is closed, closing the electric circuit to the fare box. The fare box is now ready for operation, with the trap door 43 in safe 26 open and beneath the chute formed by walls 41 and 42 (Figure 1) in the fare box.

Whenever it is desired to remove the drawer from the safe, as at the end of a round trip, or at change of drivers, etc., a key is inserted into lock 33 on the front wall 32 of the drawer. When fully pushed home the key can be turned. Turning of the key rotates shaft 79 and through the interconnecting linkage first closes the trap door 43 by the action of the trap door closing lever 104 previously described. Movement of the collar 122 moves the latching plate 118 to the left (Figures 5–7) to actuate the toggle lever 153 and to engage the trap door latching lip 128 under its stud 129. At the same time the latching pin 132 is cammed by the approach cam 127 until it falls into the notch 126 to prevent withdrawal of the latching plate. When the key in lock 33 has been turned to the end of its stroke the trap door has been closed and latched closed, and the drawer locking pins 87 and 88 have been raised, permitting removal of the box from the safe 26.

After the drawer has been removed from the safe the key can be turned back to initial position in lock 33. This will cause the pins 87 and 88 to lower again, to their projecting position, but the trap door will remain closed due to the retention of latching plate 118 by the pin 132 on the toggle lever 153. Usually a man called a "box puller" is responsible for this operation, and for the insertion of emptied drawers, but since he has only a key to lock 33 he does not have access to the contents of the drawer.

The drawer or drawers are now carried to the auditor's department. The auditor has a key for the lock 133 on the drawer lid. As previously described, insertion and rotation of the key in lock 133 will first release the trap door 43 to open position, and then withdraw the lid latching plates 142 and 152 so that the drawer lid 55 can be opened for removal of the contents of the drawer.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a walled safe having a first opening in one wall for the insertion of a drawer, and a second opening in a second wall; a totally enclosed drawer insertable into said safe through said first opening, and having a hinged top wall; a lock operable to hold said hinged top wall closed, and said hinged top wall having an opening in alignment with said second opening in the second wall of said safe when said drawer is fully inserted into said safe; a hinged trap door operable to close said opening in said drawer top wall; a latch in said drawer top wall operable to hold said trap door closed; said lock being operable to first release said trap door latch and then release said drawer top wall.

2. In the device described in claim 1, said trap door latch being ineffective to latch said trap door until the drawer top wall is closed.

3. In the device described in claim 1, said lock being so constructed and arranged that its key may be inserted or removed only when the lock has been turned to such position as to hold the hinged drawer top wall closed.

4. In the device described in claim 1, said trap door being hinged about an axis spaced from the hinge axis of said drawer top wall, and said trap door latch being carried by said drawer top wall and ineffective to latch said trap door closed unless the drawer top wall is closed.

5. In the device described in claim 1, said trap door being hinged about an axis spaced from the hinge axis of said drawer top wall, and said trap door latch being carried by said drawer top wall and ineffective to latch said trap door closed unless the drawer top wall is closed; said lock being carried by said drawer top wall, and so constructed and arranged that its key may be inserted or removed only when the lock has been turned to such position as to hold the hinged top drawer wall closed.

6. In an electrically operable fare box, the combination of a safe and a closeable lock box insertable therein in open condition for the reception of fares, means for retaining said lock box within said safe, lock controlled means for sequentially closing and locking said lock box and releasing said lock box retaining means, and means responsive to the operation of said lock controlled means for disenabling the electrical operation of said fare box to prevent feeding of fares to said lock box after closure thereof.

7. In an electrically operable fare box, the combination of a safe and a lock box insertable therein for the reception of fares, a unidirectional coupling between said lock box and said safe permitting insertion of said lock box but preventing withdrawal thereof, lock controlled means within said lock box for disenabling said unidirectional coupling to permit withdrawal of said lock box, and means responsive to the operation of said unidirectional coupling upon insertion of said lock box to disenable the electrical operation of said fare box until said unidirectional coupling is fully operative to prevent withdrawal of said lock box.

8. In a fare box assembly having an opening through a wall thereof, a lock box insertable into said fare box through said opening to a position to receive fares, means for preventing unauthorized removal of said lock box comprising a positively displaceable projection on said lock box, means within said fare box positively displaced during insertion of said lock box into the outward path of movement of said projection to positively block such outward movement, means for preventing reverse displacement of said positively displaced projection blocking means, shielding means fixed to said fare box and cooperating therewith to completely enclose said reverse displacement preventing means, means operatively interconnecting said blocking means and said reverse displacement preventing means through said shielding means, and lock controlled means for withdrawing said projection to a position where its outward movement is not blocked by said positively displaced blocking means to permit removal of said lock box from said fare box.

9. In a fare box assembly having an opening through a wall thereof, a lock box insertable into said fare box through said opening to a position to receive fares, means for preventing unauthorized removal of said lock box from said fare box comprising a projection on the exterior of said lock box, a member having a plurality of peripheral projections so spaced as to permit the reception of said lock box projection between adjacent ones thereof, said member being mounted for rotation within said fare box with one of its peripheral projections disposed in the path of movement of said lock box projection during insertion of said lock box whereby insertion of said lock box will produce rotation of said member in one direction by engagement with said one peripheral projection and cause the next succeeding peripheral projection to move into a position to block reverse movement of said lock box projection, means for preventing movement of said member other than in said one direction, shielding means fixed to said fare box and cooperating therewith to completely enclose said movement preventing means, means interconnecting said movement preventing means to said member through said shielding means, and lock controlled means for withdrawing said lock box projection from the path of movement of said peripheral projections.

10. In a fare box, the combination of a safe open at one end, a lock box insertable into said safe through said open end, and a locking mechanism adapted to permit insertion of said lock box into said safe while preventing unauthorized removal of said lock box from said safe after insertion, said locking mechanism comprising a star wheel mounted for rotation within said safe about an axis normal to the direction of lock box movement into and out of said safe, a unidirectional clutch mechanism accessible only upon partial disassembly of said fare box and coupled to said star wheel for permitting only unidirectional rotation thereof, shielding means fixed to said safe and cooperating therewith to completely enclose said unidirectional clutch mechanism, means interconnecting said unidirectional clutch mechanism to said star wheel through said shielding means a projection mounted on said lock box in a position to engage and impart unidirectional rotation to said star wheel during insertion of said lock box and to prevent withdrawal of said lock box after insertion due to its engagement with said unidirectionally rotatable star wheel, and lock controlled means within said lock box operable to withdraw said projection from the path of rotation of said star wheel to permit removal of said lock box from said safe.

11. In combination, a walled safe having a first opening in one wall thereof to permit insertion of a drawer and a second opening in a second wall, a totally enclosed drawer having a movable apertured wall and being insertable into said safe through said first opening, a trap door mounted within said drawer for movement toward and from the aperture of said movable wall to effect closure of said aperture in one position, a bolt mounted on said trap door, a latch on the movable wall of said drawer engageable by said bolt when said trap door is in its closed position, a keeper engageable with said bolt when engaged with said latch to prevent latch disengaging movement of said bolt, lock controlled means for sequentially moving said trap door to its closed position and shifting said bolt into engagement with said latch and into engagement with said keeper, and a second lock controlled means structurally independent of said first lock controlled means for so actuating said keeper as to shift said bolt from engagement with said latch to release said trap door.

12. In combination, a walled safe having a first opening in one wall to permit insertion of a drawer and a second opening in a second wall thereof, a totally enclosed drawer having a movable apertured wall and insertable into said safe through said first opening to a position in which the aperture of said movable wall is aligned with said safe second opening, means including a movable abutment on said drawer and a cooperating latch member on said safe for preventing withdrawal of said drawer from said safe, a trap door mounted within said drawer for movement toward and from the aperture of said movable wall to effect closure thereof in one position, a bolt mounted on said trap door, a latch on said drawer wall engageable by said bolt when said trap door is in its closed position, a keeper engageable with said bolt when engaged with said latch to prevent latch disengaging movement of said bolt, a member mounted for rotary reciprocation within said drawer between first and second extreme positions, lock controlled means disposed exteriorly of said wall safe for effecting rotary reciprocation thereof, means responsive to rotation of said member from one of said limit positions through a first predetermined arcuate distance to close said trap door, means actuated in response to continued rotation of said member through a second and distinct arcuate distance for shifting said bolt into engagement with said latch and said keeper, and means responsive to continued rotation of said member toward the other of said limit positions beyond said second arcuate distance for disengaging said abutment from said latch within said walled safe to permit removal of said drawer from said safe.

13. In combination, an apertured lock box, a hinged trap door mounted within said box to effect closure of said box aperture, a bolt mounted on said door, a latch in a wall of said box engageable by said bolt when said door is in closed position to prevent movement of said door, a movable keeper engageable by said bolt when in its latched position to prevent displacement of said bolt relative to said door independently of said keeper without directly restraining movement of said door, means sequentially operable to close said door and displace said bolt into engagement with said latch and with said keeper, and means for actuating said keeper to displace said bolt from engagement with said latch to open said door.

14. In a walled safe open at one end, a totally enclosed drawer insertable into said safe through the open end thereof, said drawer having an apertured hinged wall movable between a closed position in which said drawer is totally enclosed and an open position remote from said drawer, a trap door mounted for pivotal movement about an axis adjacent and parallel to the pivot axis of said wall between a first position in abutment with said wall while in its closed position to close the aperture thereof and a second position within said drawer remote from the closed position of said wall, and lock controlled means for latching said door to said wall whereby movement of both said door and said wall is prevented.

15. In an electrically operable fare box, the combination of a safe and a lock box insertable therein for the reception of fares, a unidirectional coupling between said lock box and said safe permitting insertion of said lock box into said safe while preventing its subsequent withdrawal therefrom, lock controlled means within said lock box for disenabling said unidirectional coupling to permit withdrawal of said lock box, an electrical switch connected to control the electrical operation of said fare box and actuated in response to operation of said unidirectional coupling during insertion of said lock box to modify the electrical operation of said fare box.

16. The combination defined in claim 15 wherein said unidirectional coupling is operative during each insertion of said lock box through a discrete fraction of its complete operating cycle and wherein means are provided for preventing removal of said lock box after its initial insertion into said safe a depth less than the total distance of insertion necessary to actuate said unidirectional coupling through such a discrete operating cycle fraction.

17. A fare box comprising a walled safe having a first opening in one wall to permit insertion of a lock box therein, a second opening in a second wall, and means for feeding fares to said second opening, a lock box insertable into said safe through said first opening, said lock box having an opening which is aligned with said safe second opening when said lock box is inserted into said safe, latch means in said walled safe permitting insertion of the lock box and automatically preventing removal of said lock box, a trap door movable to close the opening of said lock box, lock control means for moving said trap door to its closed position and locking it in such position and rendering said latch means inoperable to prevent removal of said lock box, and means in said fare box responsive to the closure of said trap door for preventing the passage of fares through said feeding means to said second wall opening.

18. The combination defined in claim 17 wherein the fare feeding is electrically controlled and wherein said disenabling means includes a switch actuated upon closure of said trap door to prevent fare feeding.

References Cited in the file of this patent

UNITED STATES PATENTS

| | | |
|---|---|---|
| 467,146 | Beasley | Jan. 19, 1892 |
| 901,778 | Bucknam | Oct. 20, 1908 |
| 1,984,037 | Shann | Dec. 11, 1934 |
| 2,119,592 | MacDonald | June 7, 1938 |
| 2,146,974 | Mitford | Feb. 14, 1939 |
| 2,542,876 | Main | Feb. 20, 1951 |